United States Patent [19]

Maloney et al.

[11] 4,320,715
[45] Mar. 23, 1982

[54] PARTICLEBOARD FURNISH BLENDER

[75] Inventors: Thomas M. Maloney; E. Max Huffaker, both of Pullman, Wash.

[73] Assignee: Washington State University Research Foundation, Inc., Pullman, Wash.

[21] Appl. No.: 153,274

[22] Filed: May 27, 1980

[51] Int. Cl.³ .............................................. A01C 1/08
[52] U.S. Cl. ..................................... 118/303; 427/221
[58] Field of Search ......................... 427/221; 118/303

[56] References Cited

U.S. PATENT DOCUMENTS

| 2,953,359 | 9/1960 | Mau | 118/303 |
| 3,033,159 | 5/1962 | O'Brian | 118/303 |
| 3,288,052 | 11/1966 | Hough | 118/303 |

FOREIGN PATENT DOCUMENTS 393974  12/1973  U.S.S.R. .............................. 118/303

*Primary Examiner*—Sam Silverberg
*Attorney, Agent, or Firm*—Wells, St. John & Roberts

[57] ABSTRACT

A short-retention-time blender is described for applying liquid to wood particle furnish falling freely in the form of a concentric shell through an upright cylindrical housing. The particles are fed into the center of a rotating disk within the cylindrical housing. The disk deflects the furnish radially outward against a flared deflector surface. This surface deflects the furnish directly downward substantially in the form of a uniform concentric hollow shell. Inverted conical atomizer disks are rotated on the axis of the housing to produce annular atomized spray patterns of liquid, directed outwardly against the falling furnish.

5 Claims, 5 Drawing Figures

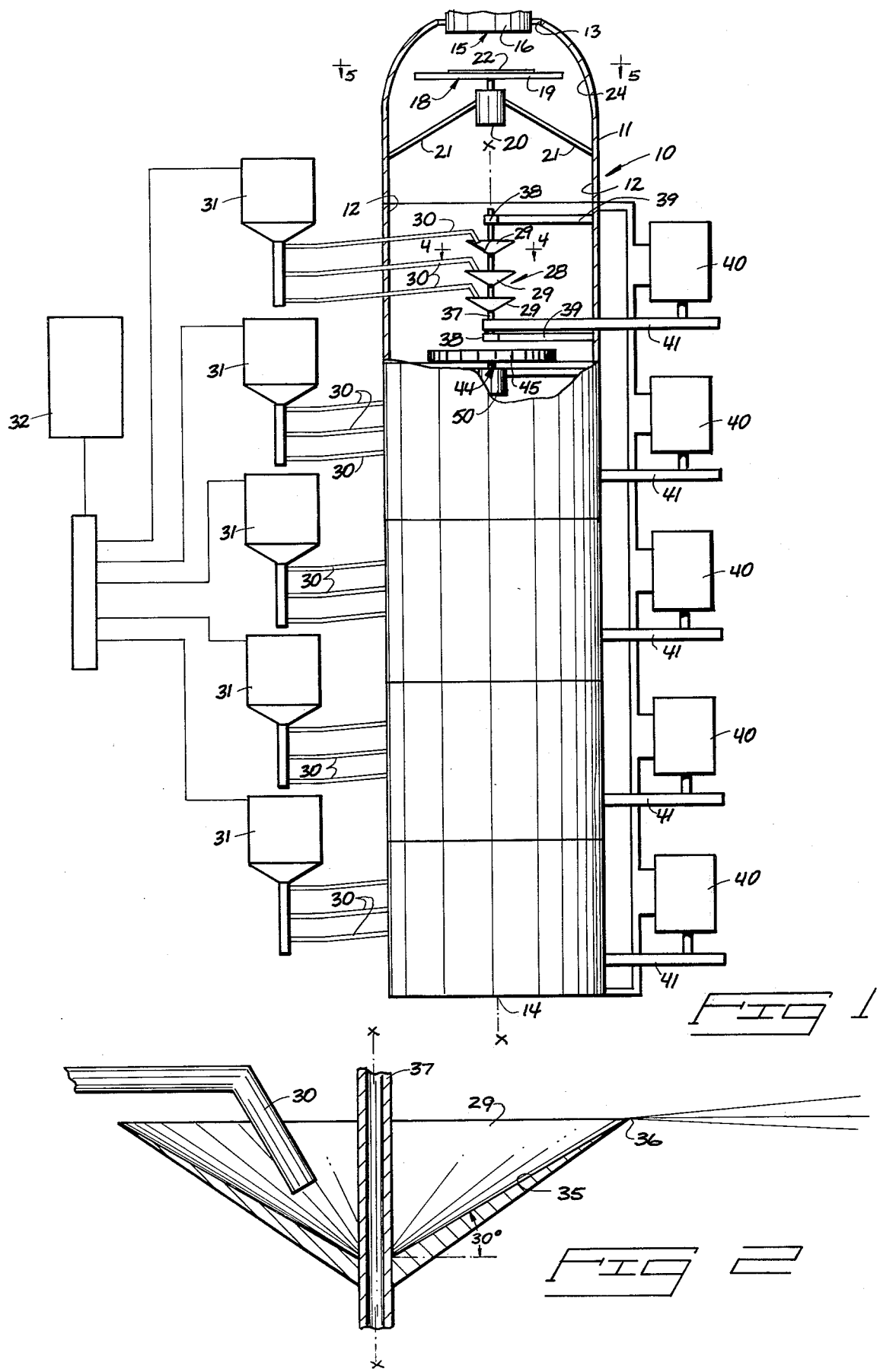

PARTICLEBOARD FURNISH BLENDER

BACKGROUND OF THE INVENTION

The present invention is related to particleboard furnish blending apparatus and more particularly to such apparatus using airless atomizing and application of resin and other liquid additives to a free falling furnish.

Conservation of composition board binder, whether it is the synthetic resin used presently or proposed resins based on wood lignins, bark extractives or other such binders, is extremely important to the wood industry and will be more important in the future. Present commercial blenders are generally considered to be inefficient. Consequently, the development of efficient blenders is a logical and high priority research need.

Particleboard and dry process fiberboard are produced from small particles or fiber bonded together by synthetic adhesives. Urea formaldehyde resin is most frequently used in production of these materials because of its lower cost in comparison with phenolic resin, both in terms of unit cost and speed of curing in a hot press. Phenol formaldehyde binder is favored for structural applications, particularly where durability is concerned. Binder cost in particleboard production can represent approximately 30% of the cost of the finished particleboard panel. Significant cost savings can therefore be realized with only slight improvement in binder efficiency.

In general, a uniform distribution of very fine droplets of resin over all wood particles in a furnish is most desirable for developing optimum board properties. Investigations have shown that application of a good distribution of small droplets of resin over the furnish is apparently the most efficient way to use binder. This, however, has been difficult to accomplish in industrial size blenders.

Short-retention-time blenders are favored (as opposed to long-retention-time blenders) for most plant use at the present time because of their small size, ease of maintenance, the ability to chill their shells more easily to reduce resin buildup, elimination of the need for compressed air at spray nozzles, and the reduction of possible air pollution developed from resin overspray. These types of blenders can damage fragile flake furnishes, thus long-retention-time blenders are favored with such furnishes.

Relatively new short-retention-time blending systems using "centrifugal" applicators have provided benefits to plant production. Such benefits as lowered maintenance costs, reduction of resin buildup within the blender and fewer resin spots on finished boards have resulted from use of centrifugal blenders. However, in general, the resin efficiency has not been improved.

Centrifugal blenders typically make use of rotating radial resin dispensing arms for airless "atomization" of the resins. Laboratory experimentation with many different forms of such apparatus has shown, however, that atomization of the resin does not occur in all cases. Instead thin streams of resin are often applied to the particles. Since all particles cannot be equally exposed to the resin streams, resin distribution must be accomplished as the particles rub together. It is not desirable to rely on rubbing action for resin distribution because many individual particles, particularly flakes, can become damaged in the process. The end result can be a low quality board.

Another problem with centrifugal applicators, as well as other forms of blenders, is that the furnish may not move through the blender in a continuous, unbroken "shell". Rather, a helical path is often developed, exposing inner walls of the blending housing. This means that part of the furnish is not exposed to the resin. Instead the resin meant for particles is applied to the walls of the housing, causing a decrease in resin efficiency and a difficult clean-up problem. An attempted solution is to cool the blender housing to reduce resin build-up. A film of condensate is formed on the inside of the blender and on the rotating blending shaft.

Airless atomizing experiments and industrial use have indicated that it is desirable to remove air turbulence from within blenders. Such removal substantially decreases the likelihood of escape of pollutants into the surrounding environment.

Airless atomizing has been previously accomplished through the use of pressure nozzles and high speed rotating disks upon which the liquid resin is applied. Pressure nozzles are subject to severe wear problems. In disk atomizing, resin received on the disk will flow immediately to the peripheral edge of the disk and be thrown radially therefrom in relatively small droplets. Such atomizers typically make use of a plurality of flat circular disks. The resin is delivered either through a central rotating shaft that mounts the disks or by an auxiliary delivery system. Care is required in the application of the resin to the disk surfaces in order that uniform atomization will result. Resin improperly deposited on a disk runs to its edge and is thrown in a random fashion. Small rivulets of resin tend to form on the disk, with the result that resin is discharged in relatively large droplets in a random pattern. Furthermore, the resulting "spray pattern" is very narrow axially, due to the perpendicular relationship of the disk surface relative to its rotating axis. The droplets tend to leave the disk in the same plane as the disk surface.

Another problem associated with short retention time blenders is that a uniform concentric shell of furnish is not typically formed within the blender housing. Therefore, it is not unusual that resin will be applied to the walls of the housing rather than the furnish. Build-up of resin on the housing walls can obviously result in waste and maintenance problems unless it is arranged to have the blender heavily loaded with furnish in order that the resin is wiped from the blender walls by the furnish. It is therefore desirable to produce and maintain a continuous concentric shell of particles passing through the blender housing to reduce the amount of resin striking the blender wall.

The present invention represents a substantial improvement over existing industrial forms of particleboard furnish blenders. It produces a uniform, airless atomized resin which is applied to a uniform shell of furnish falling axially within a concentric housing. Resin efficiency is increased and release of pollutants is minimized.

BRIEF DESCRIPTION OF THE DRAWINGS

FIG. 1 is a fragmentary schematic view of the blender;

FIG. 2 is an enlarged fragmentary view illustrating an inverted cone atomizer;

DETAILED DESCRIPTION OF A PREFERRED EMBODIMENT

Figure 3:
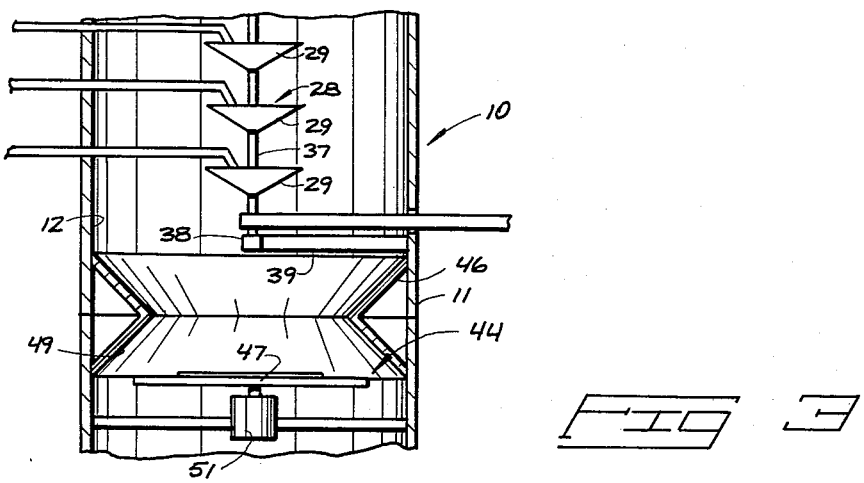
FIG. 3 is illustrative of a section of the present invention with an alternate form of agitating means.
Figure 4:
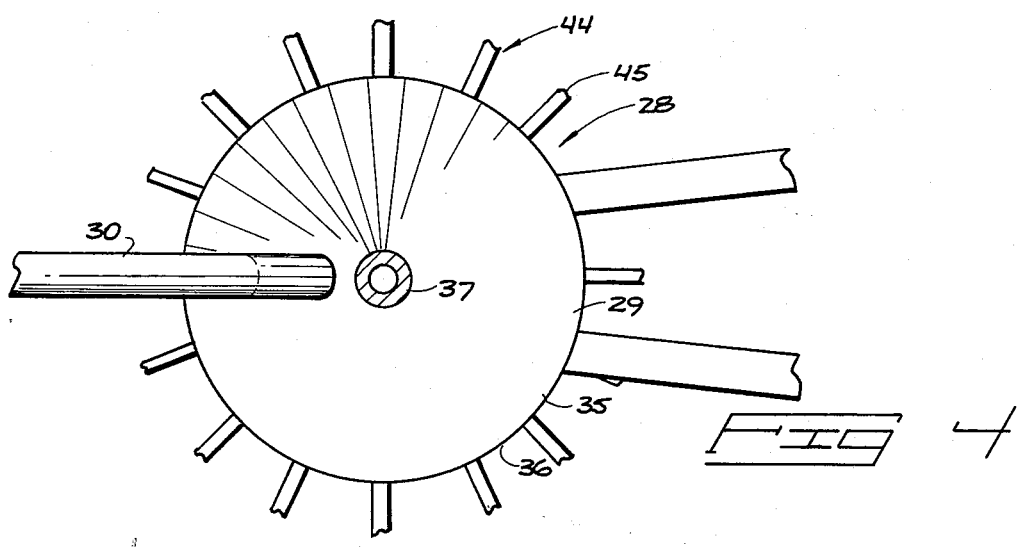
FIG. 4 is an enlarged fragmentary section view taken along line 4—4 in FIG. 1.

The function of the present blender 10 is to receive the furnish made up of individual wood particles from a furnish feeding system 15 and to apply a liquid, preferably resin or other liquid additives to the furnish for ultimate bonding of the particles into "particleboard". To this end, the present blender includes a furnish distribution means 18 and a liquid delivery means 28.

The feed means 15 may be any apparatus conventionally available for delivering a uniform, consistent flow of furnish to the blender. An elongated conveyor has been used for this purpose, but it is recognized that other systems might be used as well. The feed means 15 is therefore only generally indicated in the drawings without specific detail as to mechanical features.

Blender 10 is provided with an elongated upright housing 11. The housing 11 is hollow, including an upright cylindrical wall 12 formed along a vertical axis X—X (FIG. 1). The housing is open at an infeed top opening 13 and at a discharge bottom opening 14. The feed means 15 delivers furnish into the housing interior through the infeed top opening 13. It is preferred that the furnish received from feed means 15 be received coaxially along the center vertical axis X—X. This can be accomplished by locating a vertical discharge chute 16 along the center of the axis to feed material directly through the infeed top opening 13.

The furnish distribution means 18 is provided to accomplish uniform furnish distribution within the housing 11, forming a continuous "shell" or curtain of furnish falling concentrically through the blender.

Figure 5:
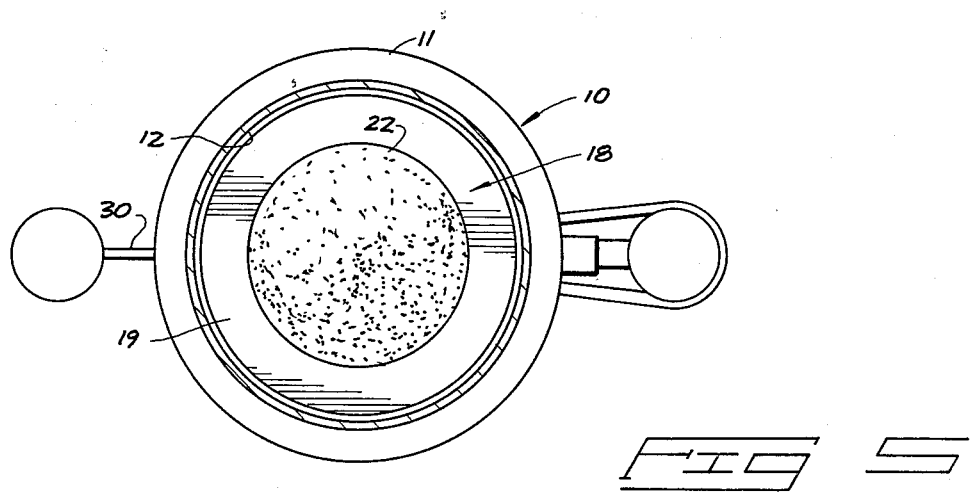
FIG. 5 is a sectional plan view taken substantially along line 5—5 in FIG. 1.

The furnish distribution means 18 is situated directly adjacent to the infeed opening 13 within the housing 11. It includes a horizontal circular disk 19 (FIGS. 1 and 5) driven to rotate on the axis X—X by a drive motor 20. The motor and disk are mounted on bearings carried by radial arms 21 on the housing. It is noted that the arms 21 could be eliminated, for example, by use of a central mounting shaft (not shown) extending longitudinally on the axis X—X (FIG. 1) through the housing. It is also noted that the remaining components described below could be mounted to such a central support arrangement.

The horizontal disk 19 is situated directly in the path of furnish falling from the feed means 15. Its function is to engage and propel the furnish radially toward the cylindrical wall 12 of the housing. Even distribution of the furnish in the radial pattern is assisted by a circular abrasive surface 22 on the disk. The abrasive surface 22 assures frictional engagement between the disk and furnish and uniform radial movement of the furnish as the disk is rotated.

The top of the housing 11 as shown in FIG. 1 is substantially spheroid. The radially moving furnish is therefore confronted with an annular flared surface 24 of the cylindrical wall 12. The surface 24 deflects the radially moving furnish directly downwardly, thereby forming a continuous concentric shell of furnish falling freely through the housing. The shell is substantially cylindrical and coaxial with the axis X—X. It has been found, as an example, that this continuous shell of furnish can be formed in a 20 inch diameter shell by use of a rotating disk having a 6 inch diameter and a furnish feed rate of 227 lbs. per minute at a bulk density of 6 lbs. per cubic foot. The disk 19 was rotated between 1,000 and 1,500 rpm. The resulting "shell" of furnish produced had a consistent "wall thickness" adjacent to cylindrical wall 12 of two inches. A continuous circular surface made up of falling furnish can therefore be exposed to the liquid delivery means 28 located directly below the disk 19 within the housing.

It should be noted that the disk 19 need not be flat. A rotating plane cone (not shown) centered on the axis has operated effectively. It is also conceivable to make use of a radial vaned cone (also not shown) for the same purpose.

The furnish distribution means preferably includes several axially spaced sets of inverted cone shaped liquid atomizers 29. The inverted cone shaped disks each receive a supply of liquid from delivery tube 30. The liquid is supplied from a number of liquid supply reservoirs 31 having a central uniform pressure supply source 32.

Each inverted cone shaped atomizer includes a cup shaped upwardly facing surface 35 (FIG. 3). This surface 35 receives the liquid and develops a uniform coating of the liquid when rotated. The surface 35 terminates at a peripheral edge 36 that is circular and centered on the axis X—X. The edge 36 is preferably sharp and presents an accurate circular configuration to assure uniform atomization of the liquid. Each atomizer 29 is mounted to a central shaft 37 carried within the housing by bearings 38 to rotate at high speed about the axis X—X. The high speed bearings 38 are mounted to radial support arms 39. These bearings could also be mounted to a common central support shaft as noted above, thereby eliminating the support arms 29.

The atomizers 27 are driven to rotate by means of a number of motors 40 situated on the outside surface of the housing. Belts 41 extend from the drive pulleys of the motor to pulleys within the housing on the shafts 37 to transmit rotational motion of the motors to the shafts and disks. It is preferred that at least one and preferably more of the motors be driven in a direction opposite the remainder so the possibility of air currents developing is eliminated.

The atomizers 29 are substantially identical. Each surface 35 may be inclined up and outwardly from the axis X—X by an acute angle (for example 30 degrees) from a horizontal plane. Other angles, however, may be effective so long as the cup shape is maintained. The diameters of the atomizers are preferably consistent (six inch diameter when used in a twenty inch inside diameter housing) and axial spacing between the atomizers in a group of three is preferably consistent to produce an even spray pattern.

The atomizer speed, however, can vary correspondingly with the viscosity of the liquid being used. Lower rotational velocities can be used for lower viscosity liquids, while the higher velocity ranges function well with high viscosity liquids.

There are several distinct advantages observed in using the inverted cone shaped atomizers 29. First, the delivery of liquid to the surfaces 35 is not critical due to the cupped surface configurations. Therefore, the delivery tubes 30 can be spaced slightly to one side of the axis. A small pool of the liquid will build up within the disks at the bottom of the surfaces 35. The liquid will then evenly coat the surfaces 35 as it spreads outwardly due to centrifugal force. This results in an even dispersion of atomized liquid at the peripheral edges 36.

The cone configuration of the atomizers also produces a relatively wide band spray pattern of very small liquid droplets—a feature that is in direct contrast to the narrow bands that result from use of flat disk atomizers. For example, a six inch diameter disk can produce a spray pattern at a distance of seven inches from the axis X—X of approximately one and one half inches wide (axially) and in a uniform circular band against the free falling furnish shell. The disks can therefore be separated according to the axial dimension of the spray pattern to produce wide axial bands of spray directed against the falling furnish. In the application shown in FIG. 1, five sets of the atomizers are being used to progressively apply the liquid to the falling shell furnish.

It has been found desirable to place some form of agitator means 44 immediately downstream of the liquid delivery means 28. Two forms of the agitator means are shown in the drawings. A first form includes a radial blade fan 45 placed after each set of atomizers 29. The fan 45 can be rotated by means of a motor 50 on the axis X—X to turn the shell of furnish over while maintaining a complete shell or curtain of furnish passing through the individual liquid application sections. The blades for the fan have their widths turned axially so no directional air current is produced in the housing.

An alternate form of the agitating means is shown in FIG. 3. Here, the falling shell of furnish is interrupted by an annular apron 46 that leads the furnish inwardly and downwardly onto a rotating horizontal disk 47. The disk is rotated by means of a motor 51. A deflector 49 is provided, forming a downwardly and outwardly inclined surface for intersecting the wood particles to deflect them in the form of a continuous concentric shell. This results in different particle surfaces and different particles being exposed to the spray at successive sets of atomizers. A more uniform application of liquid therefore results.

The above description and accompanying drawings were given by way of example to set forth a preferred form of the present invention. Other forms may fall within the scope of the following claims.

What is claimed is:

1. A particleboard furnish blending apparatus for applying liquid adhesive to wood particles, comprising:
    a hollow housing having continuous cylindrical walls centered along a vertical axis and leading to an open bottom end;
    the housing including a hemispherical upper end centered about the vertical axis and smoothly merging into the cylindrical walls to form an annular downwardly flared inner housing surface;
    an infeed opening centered about the vertical axis at the hemispherical upper end;
    furnish distribution means located within the hemispherical upper end of the housing directly beneath said infeed opening for receiving loose furnish and for forming the loose furnish into a free fall continuous concentric shell of loose particles adjacent to the housing cylindrical walls;
    the furnish distribution means including a horizontal disk coaxially mounted about the vertical axis and having a frictional upper surface for throwing furnish radially outward toward the annular downwardly flared inner housing surface;
    means for rotating the disk about the vertical axis;
    a plurality of inverted conical adhesive atomizers, each atomizer having an upwardly facing cupped surface with a circular peripheral edge centered about the vertical axis;
    the atomizers being arranged coaxially within the housing along the vertical axis for producing atomized spray bands of liquid adhesive directed outwardly against the shell of loose particles;
    means for supplying liquid adhesive to the cupped atomizer surfaces;
    means for rotating the atomizers about the vertical axis; and
    means for agitating the particles within the shell of loose particles after they drop past one atomizer and before being exposed to the next atomizer as the particles fall through the housing toward its open bottom end.

2. A particleboard furnish blender as defined in claim 1, wherein the means for rotating the atomizers is operated to rotate one set of the atomizers in one rotational direction about the axis and to rotate the remaining atomizers in an opposite rotational direction.

3. A particleboard furnish blender as defined in claim 2, wherein said agitator means is comprised of a radial blade fan coaxially mounted within the housing for rotation about the vertical axis; and
    means for rotating the radial blade fan about said axis.

4. A particleboard furnish blender as defined in claim 1 wherein the agitator means is comprised of:
    an apron on an interior surface of the vertical walls centered on the vertical axis and extending inwardly and downwardly therefrom to receive and deflect the shell of falling particles inwardly toward the axis;
    a horizontal disk within the housing directly below the apron for receiving the deflected particles;
    means for rotating the disk about said axis so the particles received thereon are thrown radially outward toward the interior wall surface; and
    deflector means radially outward of the disk for engaging particles received from the disk and deflecting them downwardly in the form of a free falling concentric shell.

5. A particleboard furnish blender as defined in claim 1 wherein said upwardly facing cup surface is inclined upwardly 30° from a horizontal plane.

* * * * *